Patented June 17, 1952

2,600,385

UNITED STATES PATENT OFFICE 2,600,385

VINYL ESTER COPOLYMERS

La Verne N. Bauer and William L. Van Horne, Philadelphia, and Harry T. Neher, Bristol, Pa., assignors to Rohm & Haas Company, Philadelphia, Pa., a corporation of Delaware No Drawing. Application May 12, 1950,
Serial No. 161,722

5 Claims. (Cl. 260—85.7)

This invention concerns copolymers of (A) vinyl esters of stearic, margaric, or palmitic acids and (B) vinyl esters of aliphatic monocarboxylic acids of 4 to 10 carbon atoms, the proportion of the long-chained vinyl ester (A) units in the copolymer to the shorter vinyl ester (B) units being from 1:0.5 to 1:$n/2$, where $n$ is the number of carbon atoms in the longest carbon chain of the shorter vinyl ester (B). This invention also concerns compositions having a reduced pour point which consist essentially of wax-containing hydrocarbon liquids in which one of the copolymers of this invention is dissolved.

Various polyvinyl esters of carboxylic acids have already been proposed, including polyvinyl butyrate and polyvinyl stearate. It has also been proposed to modify polyvinyl acetate and polyvinyl chloroacetate by interpolymerizing therewith a small proportion of a vinyl ester of an acid having at least eight carbon atoms. The resulting products swell slightly in aromatic solvents such as benzene or toluene and are useful in pressure molding.

In contrast to the previously known vinyl copolymers the copolymers of this invention depend for their utility on being freely soluble in hydrocarbons even when they are primarily of aliphatic nature, including mineral oils. The copolymers of this invention are not suitable for molding, but are useful as oil additives, being of particular value for depressing the pour point of wax-containing hydrocarbon liquids. This property depends upon the particular vinyl esters which are copolymerized and the proportions of the copolymerizing vinyl esters. The polymers of individual esters are not effective pour point depressants. Yet when a copolymer of a vinyl ester (A) of a carboxylic acid, RCOOH, where R is an alkyl group having a carbon chain of 16 to 18 carbon atoms, and of a vinyl ester (B) of a monocarboxylic acid, R'COOH, where R' is an alkyl group which contains 3 to 9 carbon atoms, are prepared with a ratio of esters A to B from 1:0.5 to 1:$n/2$, the pour point of wax-containing oils is depressed.

The depression of pour point of hydrocarbon liquids which have a waxy pour point has been attained with some polymeric materials, but most resinous or polymeric materials fail to give this effect. Some raise the pour point; some leave it unchanged. The copolymers of this invention, however, provide a sufficient lowering of pour points of such liquids to be of considerable economic value.

The preparation of the vinyl monomers from butyric through stearic acid is accomplished by known methods. They are made by running acetylene into the carboxylic acid in the presence of a suitable catalyst. While acetylene reacts with the lower fatty acids in the presence of an acidic mercury catalyst, the vinyl esters of larger carboxylic acids are prepared with the aid of a zinc or cadmium catalyst, particularly a zinc or cadmium carboxylate of the reacting acid. The vinyl esters can be purified by distillation. Vinyl stearate distills at 167° C./2–4 mm. and vinyl palmitate at 165° C./2–4 mm.

Vinyl esters are also available through acidolysis or transesterification of lower vinyl carboxylates. For example, vinyl acetate heated in the presence of mercury oxide and boron trifluoride or sulfuric acid with palmitic, margaric, or stearic acid yields the corresponding vinyl palmitate, margarate, or stearate.

While pure stearic, margaric, or palmitic acid may be used, the commercially available palmitic or stearic acids are entirely satisfactory. Likewise mixtures of such acids are satisfactory.

The second type of vinyl ester which is used to form the copolymers of this invention is derived from saturated aliphatic monocarboxylic acids having a chain of at least four carbon atoms. Typical acids of this type are butyric, valeric, hexoic, 2-ethyl-butyric, heptoic, isoheptoic, 2-ethylhexoic, octoic, nonoic, 3,5,5-trimethylhexoic, decanoic, and the like. The acid portion of the vinyl ester may be of straight- or branch-chained structure. When the latter, the longest carbon chain determines the proportion of this type of vinyl ester which can be used in the copolymer. Thus, in the case of vinyl 2-ethylbutyrate there may be copolymerized with one mole of vinyl stearate or palmitate from one half to two moles of vinyl 2-ethylbutyrate, the longest straight chain in this latter ester having a length of four carbon atoms. Hence, $n/2$ has a value of two. This rule applied to vinyl 3,5,5-trimethylhexoate gives an upper limit of three for the proportion of this vinyl ester to be copolymerized with the large vinyl ester.

To prepare the copolymers of this invention the vinyl ester, $CH_2{=}CHOOCR$, where R is an alkyl group having a chain length of 15 to 17 carbon atoms, is mixed with a vinyl ester, $$CH_2{=}CHOOCR',$$

where R' is an alkyl group having a chain length of at least three carbon atoms and containing three to nine carbon atoms, in a proportion from 1:0.5 to 1:$n/2$. The mixed vinyl esters are extended with an inert solvent such as benzene, toluene, xylene, or a close-cut naphtha and copolymerization is initiated with the aid of a polymerization catalyst under an inert atmosphere. Nitrogen serves as a suitable inert gas to exclude oxygen from the copolymerizing mixture. Copolymerization can also be effected in a lubricating oil.

As catalysts for copolymerization there are usually used organic peroxides or acyclic azo compounds, which serve as free radical catalysts. Typical of the azo catalysts is azodiisobutyronitrile. Suitable peroxides are acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butyl-peroxy)butane, methyl ethyl ketone peroxide, di-tert.-butyl peroxide, tert.-butylhydroperoxide, etc. An amount of catalyst is taken to induce copolymerization varying from 1% to 16% of the weight of mixed vinyl esters. In a preferred method the concentration of catalyst may be 1% to 5% of the monomeric esters at the start and catalyst is added as copolymerization proceeds. Solvent may likewise be added from time to time.

The solution of the two types of vinyl esters is treated with one or more of the catalysts at temperatures between 75° and 150° C. One range of temperature may be used at the start and another as copolymerization proceeds. The choice of temperature, concentration of esters, concentration of catalyst, and copolymerization schedule determines the size of copolymer formed.

The apparent molecular size of copolymer may vary from about 1000 or so up to 50,000 or more. The pour depressing effect is not dependent upon molecular size, but the effect on viscosity and viscosity index is. The larger molecular sizes are definitely useful for improving viscosity index as well as for depressing the pour point of wax-containing oils.

The following illustrative examples present some useful procedures for preparing the copolymers of this invention. Parts are by weight.

Example 1

A reaction vessel was equipped with stirrer, reflux condenser, thermometer, dropping funnel and inlet tube for admitting inert gas. The vessel was heated with an oil bath. A mixture was prepared from 39.25 parts of vinyl stearate, 10.75 parts of vinyl 2-ethylhexoate, 25 parts of toluene, and 1.5 parts of benzoyl peroxide. While the reaction vessel was maintained at 105°–112° C. and nitrogen was passed therethrough, the mixture was slowly run into this vessel over the course of 1.75 hours. Thereafter the following temperature schedule was observed: to 2.75 hours, 110° C.; then to 4.5 hours, 105° C.; and then to 7.75 hours, 103° C. Additions of benzoyl peroxide were 0.6, 1.5, 0.6, and 0.24 parts at 2.75, 4.5, 5.5, and 6.5 hours respectively. Toluene was added as follows: at 2.75 hours, 43 parts and at 7.5 hours, 17 parts. The product was a solution containing 32.6% of copolymer. Adjusted to a 30% concentration with toluene, the resulting solution had a viscosity of 15.3 centistokes at 100° F.

There were mixed 54 parts of the 32.6% copolymer solution, 57 parts of the 30% solution, and 52 parts of a light lubricating oil. The mixture was heated and the toluene distilled therefrom. Heating was carried to 140° C./2 mm. to give a 35.4% solution of copolymer in oil. This solution was a particularly convenient form for adding the copolymer to wax-containing oils.

Example 2

The above procedure was followed with a mixture of 27 parts of vinyl stearate, 23 parts of vinyl hexoate, 25 parts of toluene, and 2.5 parts of benzoyl peroxide. The initial temperatures were kept in the range of 110°–120° C. for 4.5 hours and copolymerization was continued at 101–103° C. until the end of the heating period of 7.75 hours. The mixture was added to the reaction vessel over a period of 1.75 hours with addition of 17 parts of toluene at 0.5 hours. Addition of toluene was also made at 7.5 hours in an amount of 87 parts. Benzoyl peroxide was added at 2.75, 4.5, 5.5., and 6.5 hours in portions of 1, 2.5, 1, and 0.4 parts respectively. Heating was discontinued at 7.75 hours but stirring was continued until the batch cooled to 40° C. The product was a 27.4% solution of copolymer. A 25% solution of the copolymer in toluene had a viscosity of 9.3 centistokes at 100° F.

A part of the product was mixed and heated with a light lubricating oil to transfer the copolymer to the oil as above. A 34.9% solution of copolymer in oil was thus prepared. This was found a useful additive for petroleum fluids having waxy pour points to depress the pour point as much as 55° F.

Example 3

A mixture of 166 parts of vinyl stearate, 84 parts of vinyl isoheptoate, 12.5 parts of ethyl azodiisobutyrate, and 100 parts xylene was slowly added to the reaction vessel under a nitrogen atmosphere with the temperature of the vessel held at 100° C. Additions of catalyst were 5, 12.5, 5, and 2 parts at 2.25, 4.25, 5, and 6 hours respectively. Heating was discontinued at 23 hours at which time 440 parts of toluene was added. Stirring was continued until a batch temperature of 40° C. was reached. The product was a 25.7% solution of copolymer of a viscosity of 3 centistokes at 100° F.

Example 4

A mixture was prepared from 120 parts of vinyl palmitate, 380 parts of a vinyl decanoate which contained a small amount of vinyl octoate, 25 parts of benzoyl peroxide, and 250 parts of toluene. With the reaction vessel heated at 120° C. and a current of nitrogen gas passing through the vessel, the mixture was slowly added over a period of 1.8 hours. At 0.3 hour a portion of 250 parts of toluene was run into the reaction vessel. Other additions of toluene were 175 parts, 175 parts, 86 parts, and 86 parts at 2.8, 4.8, 5.8, and 6.8 hours respectively. At these same times catalyst was added in amounts of 10, 25, 10, and 4 parts. Heating was decreased at 4.8 hours to hold the reaction mixture at 102°–105° C. and was discontinued at 7.83 hours. The product was a 32.5% solution of copolymer. A part of this product was diluted with toluene to a 30% copolymer content. This solution had a viscosity of 11.8 centistokes at 100° F. It was added to a wax-containing oil and the toluene stripped therefrom at temperatures up to 140° C./20 mm. This oil solution was then diluted to a copolymer content of 0.5% by addition of more wax-containing oil. The pour point of this solution was −15° F. This same pour point was found at 0.25% of this copolymer in this oil. This was a depression of 40° F.

Example 5

A mixture was prepared from 28.8 parts of vinyl stearate, 21.2 parts of vinyl butyrate, 25 parts of toluene, and 1.91 parts of tert.-butyl perbenzoate. This mixture was slowly run into the reaction vessel under a nitrogen atmosphere during the course of 1.6 hours with the temperature held at 110°–112° C. After 2.8 hours the temperature was reduced to 95° C. and held at this level until 24.25 hours when heating was discontinued. Four small portions of the same peroxide were made at 3.5, 5.5, 6.5, and 7.5 hours for a total of 3.75 parts. Additions of toluene amounted to 70 parts. The product was a 26.2% solution of copolymer, which in a 25% toluene solution had a viscosity of 7 centistokes at 100° F.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97—47). In some instances, this test was supplemented or replaced with shock chilling and/or maximum pour tests. Cf. Proc. A. S. T. M. 45, Appendix I, p. 244 (1945). The shock chilling determination is made by observing the sample during the initial cooling step with the cooling jacket at —60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (Oil I). This was an oil which proved to be relatively sensitive to the action of pour point depressants. A second oil (Oil II) was a 500 Mid-Continent solvent-extracted neutral (S. A. E. 30) having a pour point of +25° F. This was known to be an oil which was not readily changed as to its pour point. The third oil (Oil III) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F.

A copolymer was prepared from vinyl stearate and vinyl butyrate in a 1:2 mole ratio. It was treated as a pour point depressant in Oil I. At 0.5% is gave a pour point of —20° F., at 0.25% of —15° F., at 0.1% of —10° F. and at 0.04% of 0° F. A copolymer from the same monomers but in a 1:1.6 mole ratio provided the following pour points in Oil I: at 0.5%, —10° F.; at 0.25%, 0° F.; and at 0.1%, —5° F. A copolymer at a 1:0.5 mole ratio gave a pour point of 0° F. at 0.5% in Oil I.

A copolymer was prepared from vinyl stearate and vinyl hexoate in a 1:3 mole ratio. In Oil I at 0.5% it gave a pour point of +10° F. A copolymer from the same monomer in a 1:2.4 mole ratio gave pour points in Oil I of —30° F. and —20° F. at 0.5% and 0.25% respectively. In Oil II at 0.5% the pour point was —10° F. by shock chilling. This solution had a maximum pour test of —5° F. A copolymer from these monomers in a 1:0.5 mole ratio gave pour points of 0° F. at 0.5% to 0.1% in Oil I.

A copolymer was prepared from vinyl stearate and vinyl 2-ethylhexoate in a 1:0.5 mole ratio gave pour points of —5° F. at 0.5% and 0.25% in Oil I. A similar copolymer with a 1:1.8 mole ratio gave pour points of —35° F. and —30° F. at 0.5% and 0.25% in Oil I. A copolymer from the same monomers in a 1:2.5 mole ratio gave pour points of —30° F. and 0° F. at 0.5% and 0.25% in Oil I. A copolymer from these monomers in a 1:3.4 mole ratio fail to depress the pour point of Oil I.

A copolymer from vinyl stearate and vinyl isoheptoate in a 1:1 mole ratio in Oil I gave pour points of —20° F., —20° F., —15° F., and —10° F. at 0.5%, 0.25%, 0.1%, and 0.04% respectively.

A copolymer from vinyl stearate and vinyl decanoate in a 1:0.5 mole ratio gave pour points of —20° F. and —5° F. in Oil I at 0.5% and 0.25%. A copolymer from these same monomers but in a 1:4.6 mole ratio gave pour points of —20° F., —20° F., and —5° F. at 0.5%, 0.25%, and 0.1% respectively.

A polymer of vinyl stearate was dissolved in Oil I at 0.5%. The pour point was +25° F. A polymer of the vinyl decanoate was dissolved in Oil I at 0.5%. The pour point was +30° F. These two polymers were mixed in a 1:4 mole ratio and the mixture dissolved in Oil I at 0.5%. No depression of pour point resulted.

A copolymer of vinyl stearate and vinyl decanoate in a 1:4 mole ratio was carried to molecular size such that a 30% solution in toluene had a viscosity of 154 centistokes at 100° F. This copolymer was examined over a range of concentrations in an oil which had viscosities of 5.25 centistokes at 210° F. and 45.1 centistokes at 100° F., giving a viscosity index of 16. At 0.8% of copolymer in this oil viscosities were 7.02 centistokes at 210° F. and 59.6 centistokes at 100° F., yielding a viscosity index of 77. A 2% solution in the oil had viscosities of 10.1 centistokes at 210° F. and 85.1 centistokes at 100° F., giving a viscosity index of 107. At 3.2% of the copolymer in the oil viscosities were 13.9 centistokes at 210° F. and 114.3 centistokes at 100° F., giving a viscosity index of 121.

A vinyl palmitate-vinyl octoate copolymer was prepared in a 1:2 mole ratio. Pour points of —20° F., —25° F., and —10° F. were found with Oil I containing 0.5%, 0.25%, and 0.1% of the copolymer respectively.

A vinyl palmitate-vinyl 2-ethylhexoate copolymer in which the two monomers were copolymerized in a 1:1 mole ratio gave pour points of —20° F. at 0.5% to 0.1% and a pour point of —10° F. at 0.04%, all in Oil I. In Oil II at 0.5% the pour point was —5° F. by the maximum pour test. A solution of 0.1% of this copolymer in Oil III gave a pour point of —5° F.

A copolymer from vinyl palmitate and vinyl 3,5,5-trimethylhexoate in a 1:1 mole ratio gave pour points in Oil I at 0.5% and 0.25% of —20° F. A copolymer in a 1:5 mole ratio failed to depress the pour point of Oil I. A copolymer from vinyl stearate and vinyl 3,5,5-trimethylhexoate in a 1:3 mole ratio depressed the pour point of Oil I to —10° F. at 0.5%. A copolymer from vinyl stearate and vinyl 3,5,5-trimethylhexoate in a 1:1 mole ratio gave a pour point of —20° F. at 0.5%.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as antioxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

These copolymers may be used in conjunction with other polymeric materials and other types of oil-additives, such as anti-oxidants, wear-resisting agents, detergents, and the like.

We claim:

1. A copolymer of a vinyl ester (A) of a monocarboxylic acid, RCOOH, wherein R is an alkyl group having a chain length of 15 to 17 carbon atoms, and a vinyl ester (B) of a monocarboxylic acid, R'COOH, wherein R' is an alkyl group having a carbon chain of at least three carbon atoms and containing not over nine carbon atoms, the ratio of vinyl ester (A) groups to vinyl ester (B) groups being from 1:0.5 to 1:$n/2$, where $n$ is the number of carbon atoms in the longest chain of the monocarboxylic acid R'COOH.

2. A copolymer of vinyl stearate and vinyl butyrate, the ratio of vinyl stearate groups in said copolymer to vinyl butyrate groups being from 1:0.5 to 1:2.

3. A copolymer of vinyl stearate and vinyl 2-ethylhexoate, the ratio of vinyl stearate groups in said copolymer to vinyl 2-ethylhexoate groups being from 1:0.5 to 1:3.

4. A copolymer of vinyl stearate and vinyl 3,5,5-trimethylhexoate, the ratio of vinyl stearate groups in said copolymer to vinyl 3,5,5-trimethylhexoate groups being from 1:0.5 to 1:3.

5. A copolymer of vinyl palmitate and vinyl 3,5,5-trimethylhexoate, the ratio of vinyl palmitate groups in said copolymer to vinyl 3,5,5-trimethylhexoate groups being from 1:0.5 to 1:3.

LA VERNE N. BAUER.
WILLIAM L. VAN HORNE.
HARRY T. NEHER.

REFERENCES CITED

The following references are of record in the file of this patent:

UNITED STATES PATENTS

| Number | Name | Date |
| --- | --- | --- |
| 2,020,714 | Wulff et al. | Nov. 12, 1935 |
| 2,118,864 | Reppe | May 31, 1938 |
| 2,263,598 | Stark et al. | Nov. 25, 1941 |

FOREIGN PATENTS

| Number | Country | Date |
| --- | --- | --- |
| 395,473 | Great Britain | July 20, 1933 |